June 9, 1925.  
W. L. O BRIEN  
1,541,434  
MACHINE FOR WEAVING FRICTION MATERIAL ON CLUTCH DISKS  
Filed July 20, 1923  9 Sheets-Sheet 1

Inventor  
William L. O'Brien  
By Francis D. Hardesty  
His Attorney

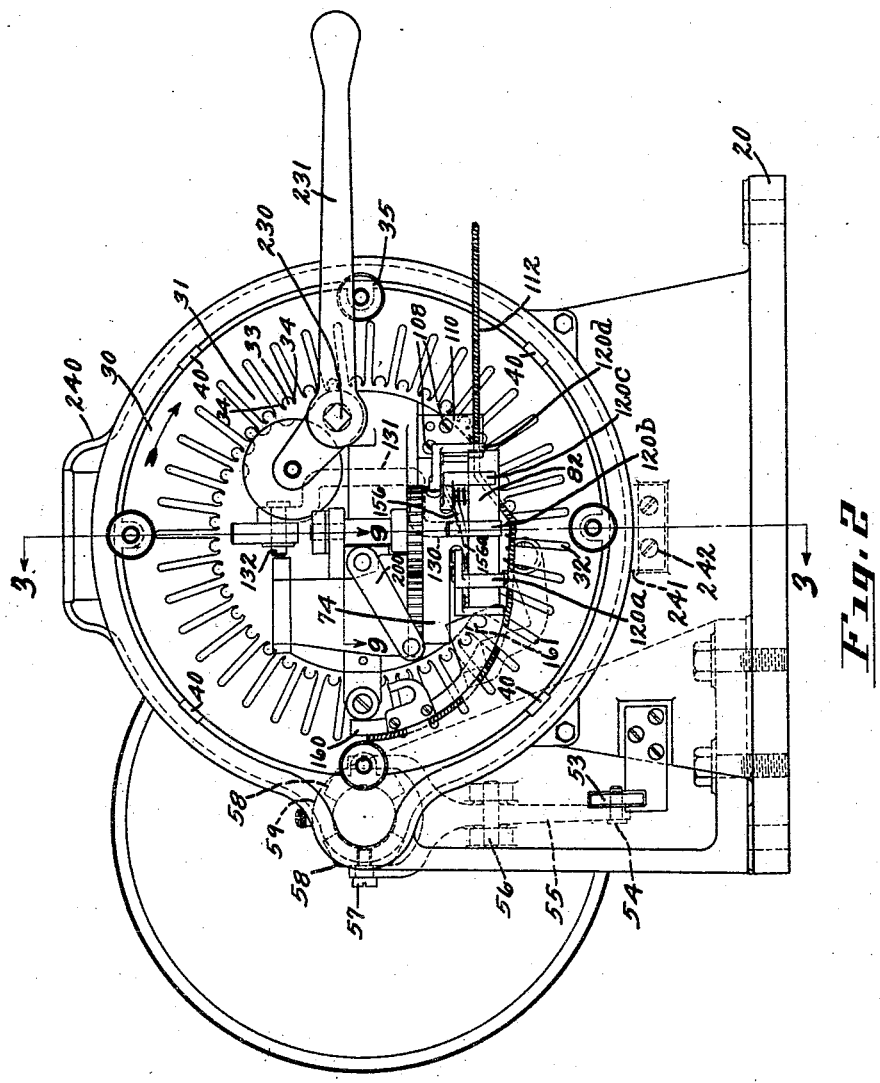

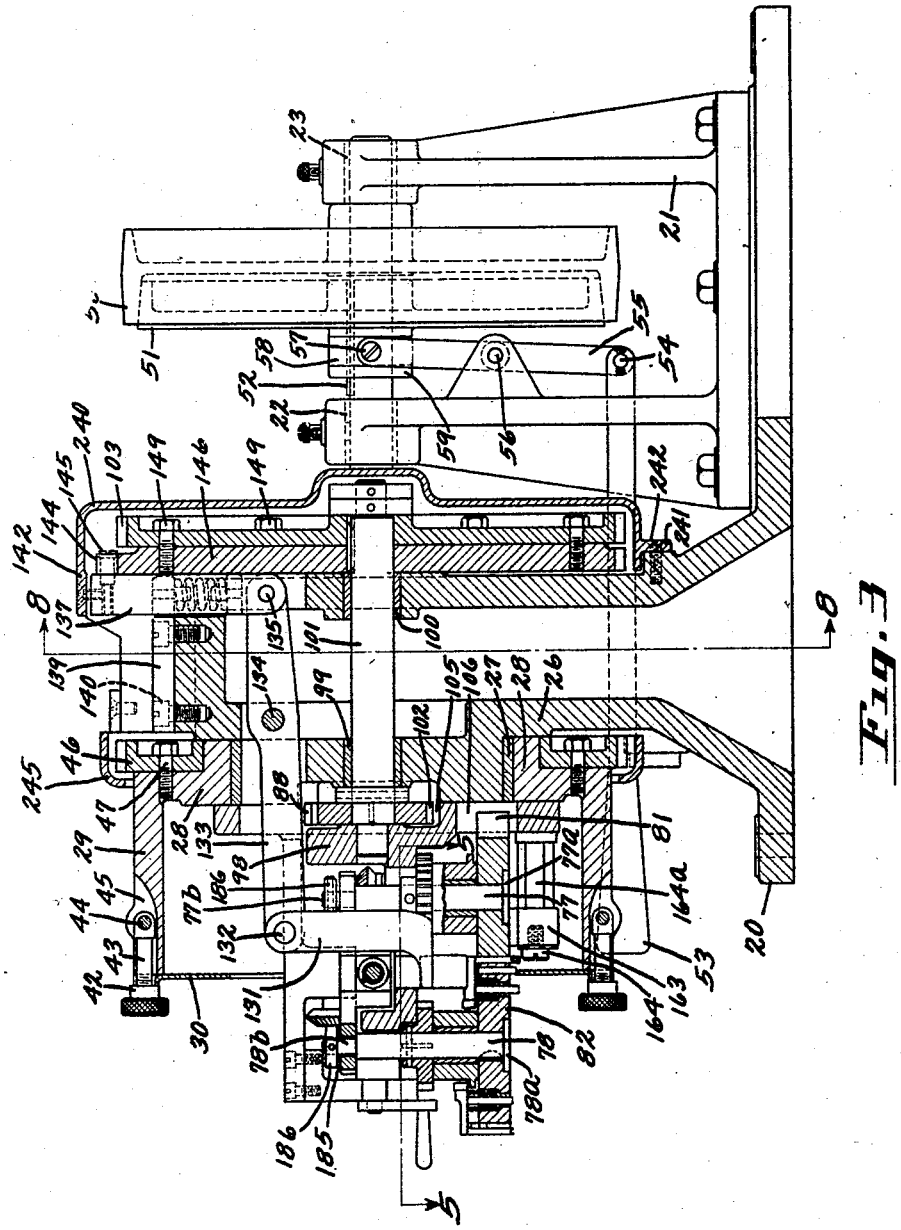

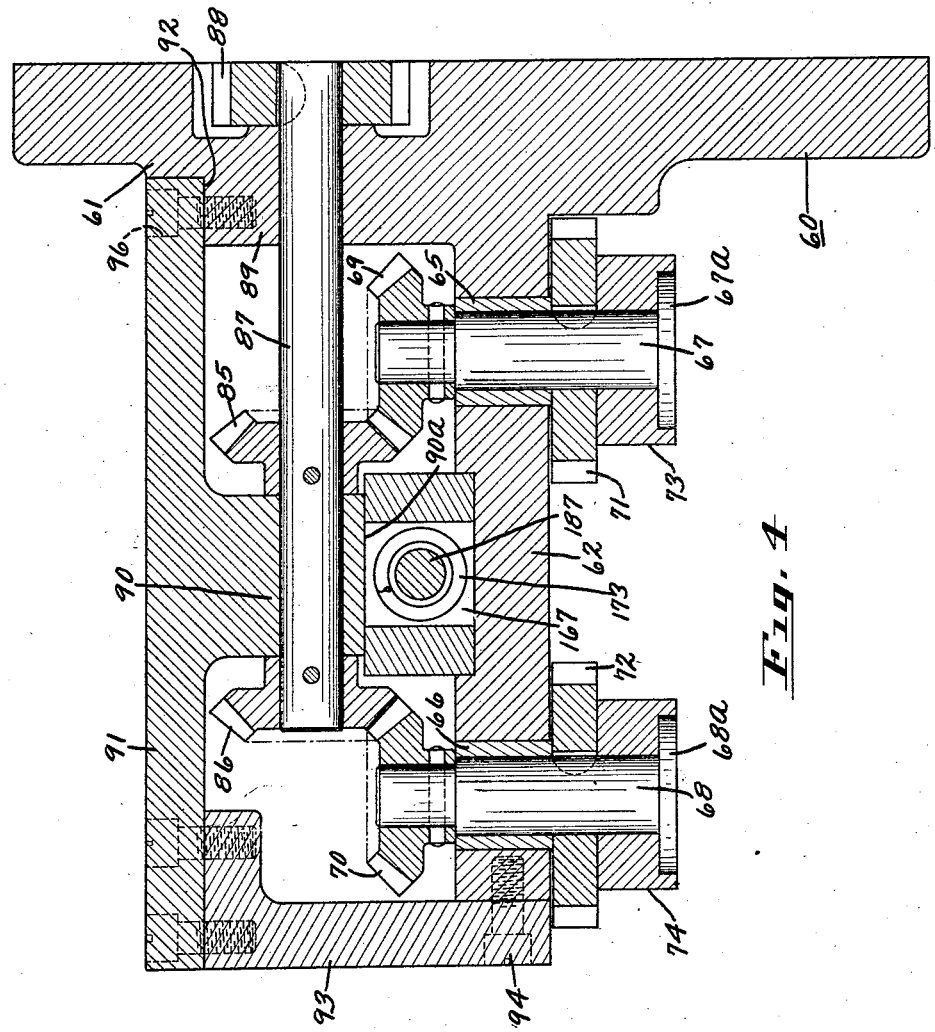

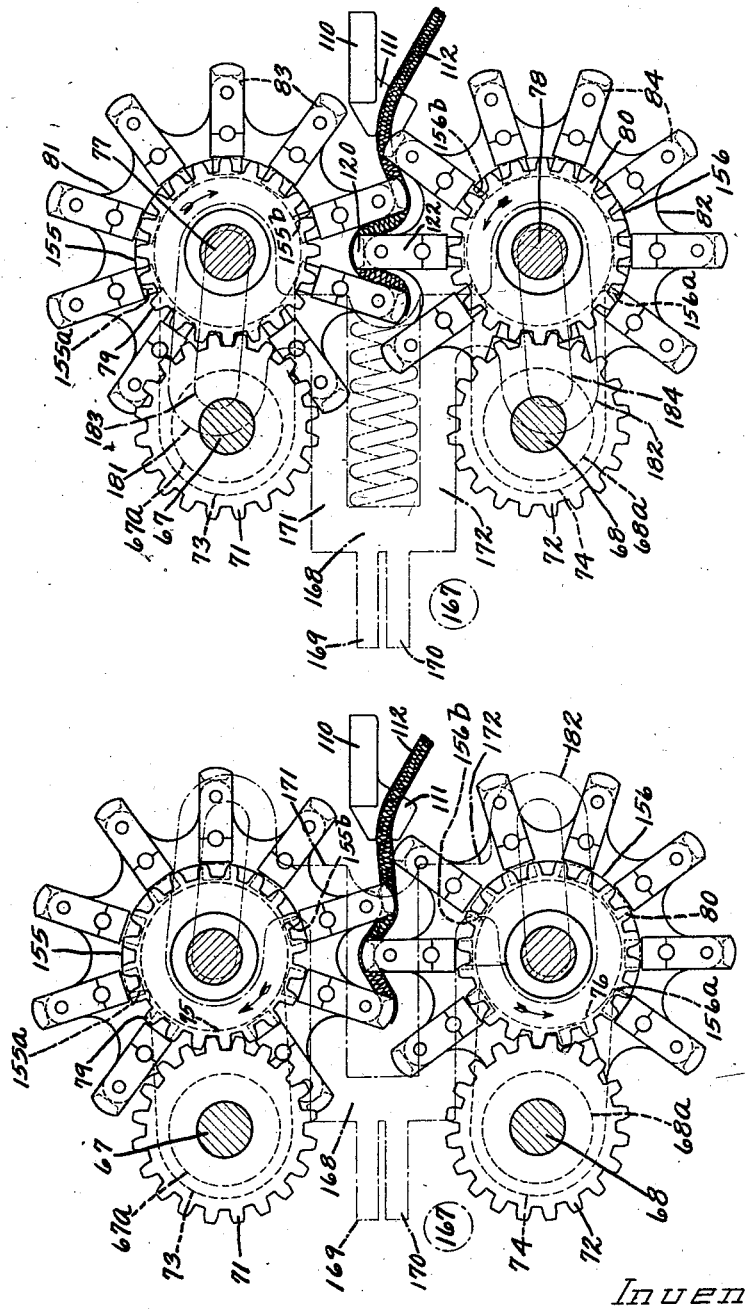

June 9, 1925. 1,541,434
W. L. O'BRIEN
MACHINE FOR WEAVING FRICTION MATERIAL ON CLUTCH DISKS
Filed July 20, 1923   9 Sheets-Sheet 6
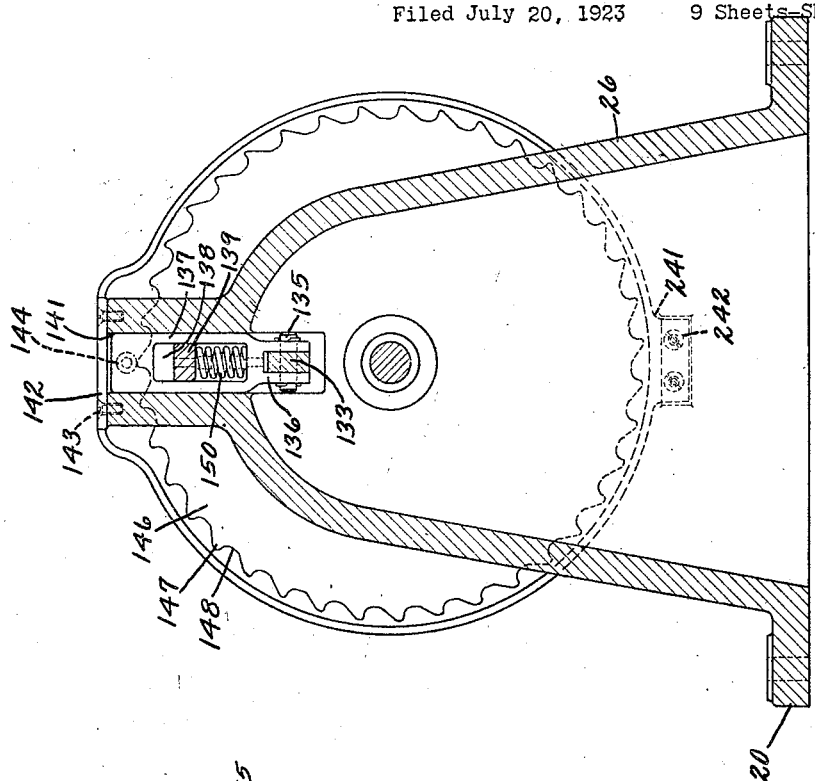
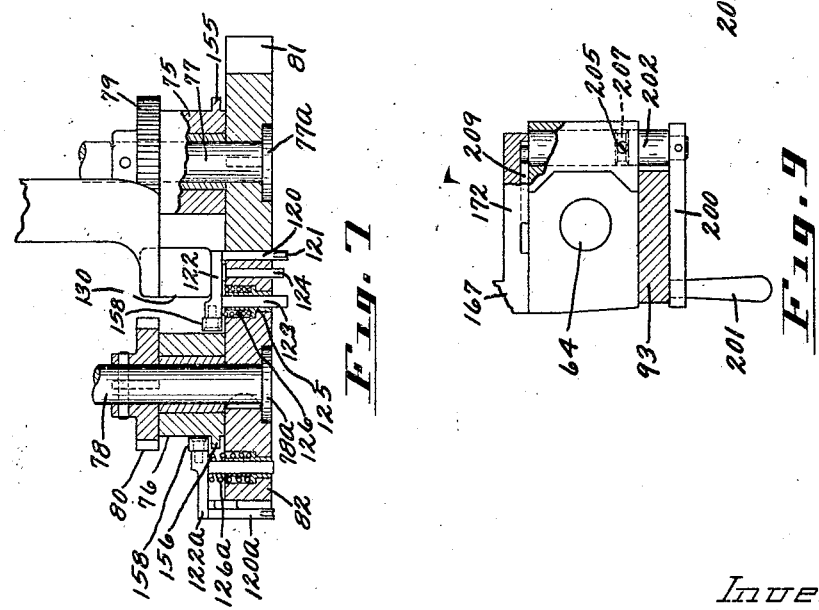
Inventor
William L. O'Brien
By Francis D. Hardesty
His Attorney June 9, 1925.
W. L. O'BRIEN
1,541,434
MACHINE FOR WEAVING FRICTION MATERIAL ON CLUTCH DISKS
Filed July 20, 1923   9 Sheets-Sheet 7
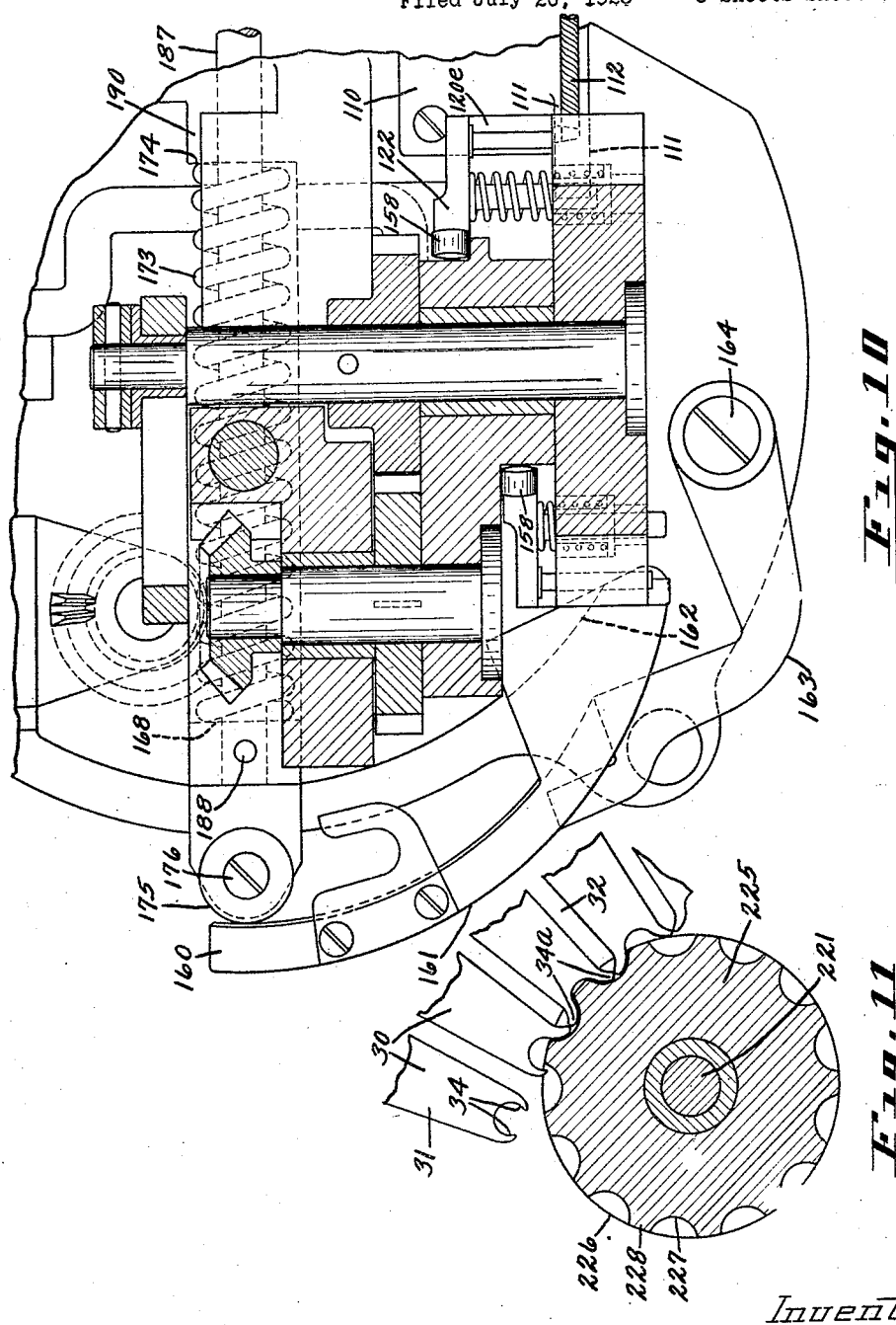
Inventor
William L. O'Brien
By Francis D. Hardesty
His Attorney June 9, 1925. 1,541,434
W. L. O'BRIEN
MACHINE FOR WEAVING FRICTION MATERIAL ON CLUTCH DISKS
Filed July 20, 1923 9 Sheets-Sheet 8

Inventor
William L. O'Brien
By Francis D. Hardesty
His Attorney

Patented June 9, 1925.

1,541,434

UNITED STATES PATENT OFFICE.

WILLIAM L. O'BRIEN, OF DAYTON, OHIO, ASSIGNOR TO GENERAL MOTORS RESEARCH CORPORATION, OF DAYTON, OHIO, A CORPORATION OF DELAWARE.

MACHINE FOR WEAVING FRICTION MATERIAL ON CLUTCH DISKS.

Application filed July 20, 1923. Serial No. 652,847.

*To all whom it may concern:*

Be it known that I, WILLIAM L. O'BRIEN, a citizen of the United States of America, residing at Dayton, county of Montgomery, and State of Ohio, have invented certain new and useful Improvements in Machines for Weaving Friction Material on Clutch Disks, of which the following is a full, clear, and exact description.

This invention relates to weaving apparatus and particularly to apparatus for the manufacture of clutch plates of the type wherein friction material in the form of a continuous cord is attached by weaving the cord into slots or notches provided by the plate.

It is among the objects of the invention to perform the various steps of attaching the cord to the plate automatically by means of suitable machinery whereby to decrease the cost of manufacture and whereby the application of the friction material will be more uniformly effected.

Further objects and advantages of the present invention will be apparent from the following description, reference being had to the accompanying drawings, wherein preferred forms of embodiment of the present invention are clearly shown.

In the drawings:

Fig. 2 is an end elevation looking in the direction of arrow 2 in Fig. 1.

Fig. 3 is a side elevation partly in section, the section being taken on the line 3—3 of Fig. 2.

Fig. 4 is a sectional view on an enlarged scale, taken substantially on the line 4—4 of Fig. 1.

Figs. 5 and 6 are sectional views taken on the line 5—5 of Fig. 3 showing the loop forming mechanism in two positions of operation.

Fig. 7 is a sectional view on an enlarged scale of the loop forming mechanism shown in Fig. 3.

Fig. 8 is a sectional view taken on the line 8—8 of Fig. 3.

Fig. 9 is a fragmentary view partly in section taken substantially on the line 9—9 of Fig. 2.

Fig. 10 is a sectional view on an enlarged scale taken on the line 10—10 of Fig. 1.

Fig. 11 is a sectional view of a prong bending wheel taken on the line 11—11 of Fig. 1.

Figure 1:
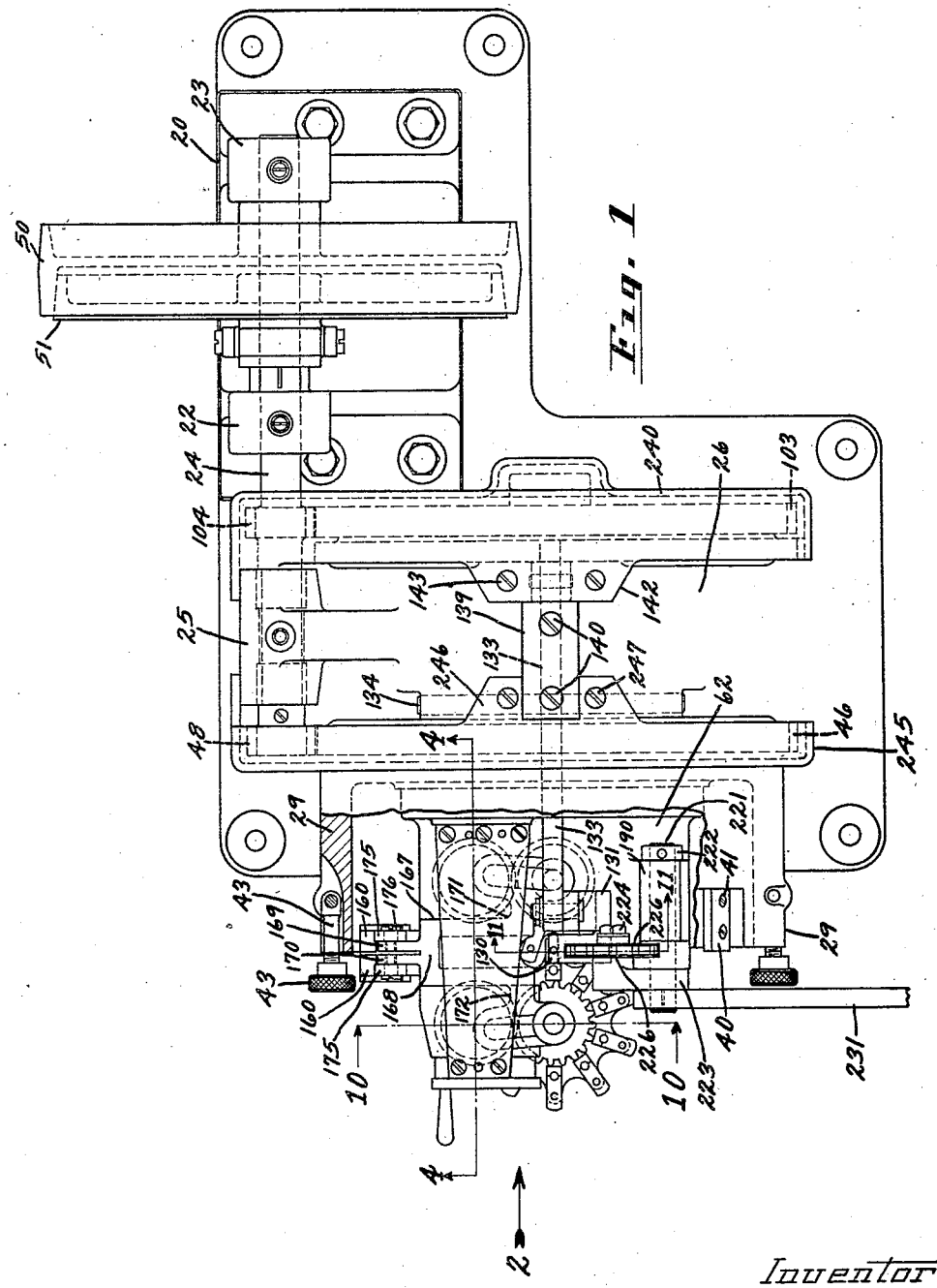
Fig. 1 is a plan view of a machine for carrying out the present invention, a part thereof being broken away for sake of clearness.

The clutch plate machine, now to be described, comprises in general mechanism upon which a clutch plate may be readily secured and by means of which the clutch plate may be rotated about its own axis; mechanism for shaping the friction cord into loops located adjacent the ends of radial slots provided in the clutch plate; mechanism for introducing the loops of the friction cord into the slots while the plate is revolving; and mechanism for pushing or packing the friction cord down into the slots so as to provide a compact woven structure which includes a plurality of turns of friction cord interwoven with spaced portions of the clutch plate. The machine includes also a device for operating upon the clutch plate so as to retain the friction material permanently in position.

*Clutch plate rotating mechanism.*

The clutch plate machine includes a base 20 supporting a bracket 21 provided bearings 22 and 23 for a main shaft 24 which is journalled also in a bearing 25 carried by a hollow pedestal 26 provided by the base 20. The pedestal 26 carries a bearing 27 upon which is journalled the hub 28 of a rotatable support which includes an annular flange 29 for supporting a clutch 30. Referring to Fig. 2 the disk 30 includes a plurality of equally spaced projections or teeth 31 formed by providing the plate with equally spaced radially extending notches 32, each tooth 31 is provided with a notch 33 at its free end in order to form two prongs 34 for a purpose to be described. Plate 30 is provided with a plurality of U-shaped notches 35 which are preferably equidistant.

These notches receive parts of the clutch of which the plate forms a part, and are used to advantage in securing the clutch plate to the clutch plate support 29.

The plate 30 is positioned against the outer face of the support 29 and located by means of locating blocks 40 attached to the holder 29 by screws 41. Endwise movement of the plate 30 is prevented by nuts 42 each threaded upon a bolt 43 pivoted at 44 upon the holder 29 which is notched at 45 to provide a recess for receiving the bolt 43.

Figure 14:
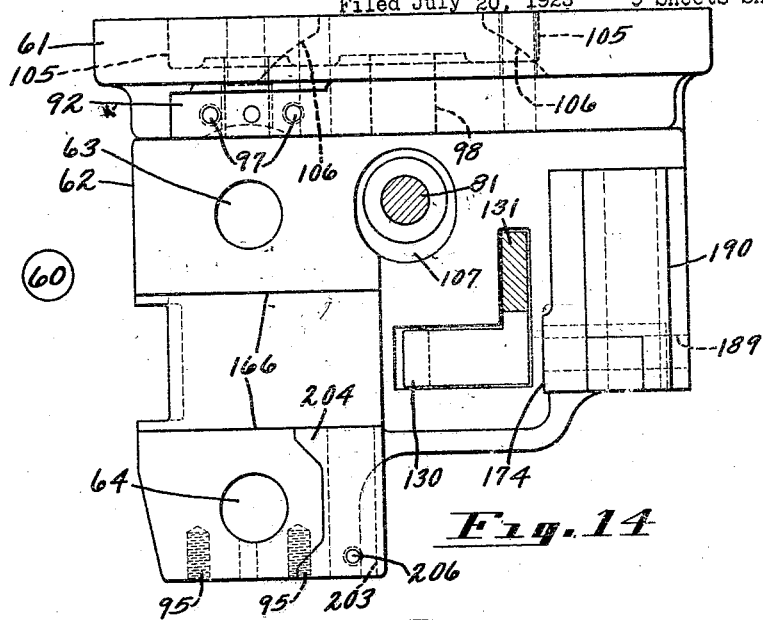
Figs. 14 and 15 are plan and end elevation views respectively of a bracket for supporting certain parts of the mechanism.
Figure 15:
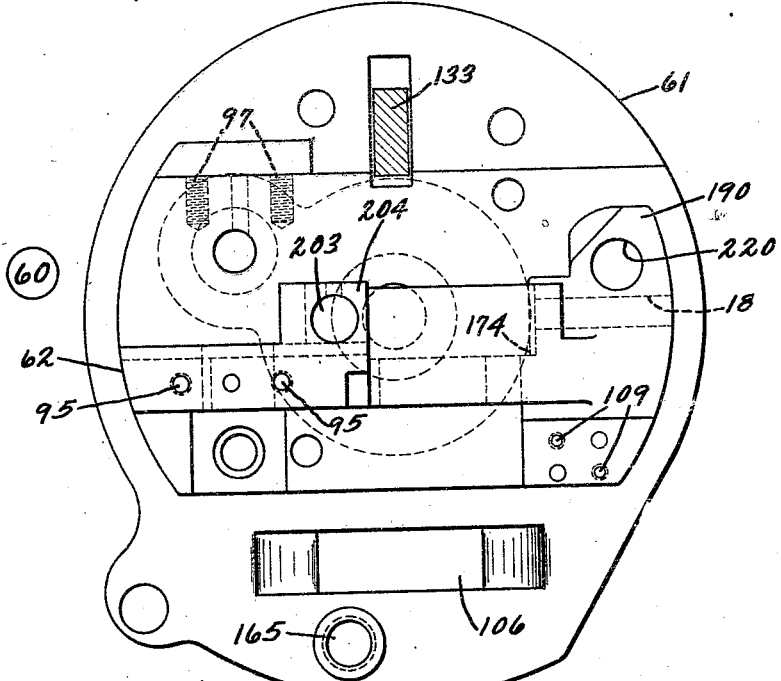

A ring gear 46 is attached to the hub 28 by screws 47 and engages a gear 48 attached to the shaft 24. A driving pulley 50 is loosely mounted on shaft 24 and is provided with a conical clutch surface cooperating with a shiftable clutch member 51 having slidable driving engagement with the shaft 24 through a key 52. The clutch 51 is shifted endwise by means of a rod 53 which is attached at 54 to one end of a lever 55 having an intermediate point pivoted at 56 upon the bracket 21, and having its forked end attached by screws 57 to clutch shifting blocks 58 engaging a grooved hub 59 attached to the clutch member 51. When the pulley 50 and the clutch 51 are engaged rotation of the pulley will cause the clutch plate carrier 29 to revolve on its bearing 27. Endwise movement of the hub 28 of carrier 29 is prevented by the pedestal 26 abutting one end of the hub 28 and by means of the substantially circular mounting base 61 of a bracket 60 (shown in detail in Figs. 14 and 15) which abuts the other end of the hub.

*Loop forming mechanism.*

The bracket 60 includes a shelf 62 provided with holes 63 and 64 (see Fig. 14) for receiving bearings 65 and 66 respectively in which are journalled shafts 67 and 68 respectively. Shafts 67 and 68 are attached to beveled gears 69 and 70 respectively and carry gears 71 and 72 respectively. Shafts 67 and 68 are provided with heads 67$^a$ and 68$^a$ which support, respectively, arms 73 and 74 which are pivoted on the shafts 67 and 68, respectively. Arms 73 and 74 are provided, respectively, with hubs 75 and 76, providing bearing for shafts 77 and 78, respectively, attached to gears 79 and 80, respectively, which mesh with gears 71 and 72, respectively. Shafts 77 and 78 are provided with heads 77$^a$ and 78$^a$, respectively, for supporting loop forming wheels or gears 81 and 82, respectively. Gear 81 is provided with teeth 83, and gear 82 with teeth 84, which mesh with teeth 83, above and adjacent to certain slots 32 of the plates 30 as indicated in Fig. 2.

The mechanism for driving the loop forming wheels 81 and 82 include in addition to the gearing described, gears 85 and 86 meshing with gears 69 and 70, respectively. Gears 85 and 86 are attached to shaft 87 which carries a gear 88, and is supported by a bearing 89 provided by the base 61 of bracket 60 and by a bearing 90 depending from a shelf 91 supported at one end upon a ledge 92 provided by base 61, and at the other end by a post 93. Post 93 is attached by screws 94 threaded into tap holes 95 in shelf 62 (see Figs. 14 and 15). Shelf 91 is attached to ledge 92 by screws 96 entering tap holes 97 provided in base 61.

The shelf of base 61 provides a bearing 98 and the pedestal 26 provides bearings 99 and 100 for supporting a shaft 101 which is attached to a gear 102 meshing with gear 88, and attached to a gear 103 meshing with gear 104 attached to shaft 24. The base 61 of bracket 60 is provided with a recess 105 for receiving the gears 88 and 102, with a recess 106 for providing clearance for the forming wheel 81, and with an elongated hole 107 for receiving shaft 77 of the loop forming wheel 81.

By means of screws 108 entering tapped holes 109 in shelf 62 of bracket 60 a bracket 110 provided with a lug 111 is attached to the shelf 62. Lug 111 is grooved in order to receive the friction cord 112 (see Figs. 5 and 6).

*Mechanism for introducing loops of the friction cord into slots.*

Each loop forming wheel supports adjacent the outer end of each tooth a knock off plunger 120 provided with a groove 121 for receiving the cord 112. The plunger 120 is carried by a block 122 supported on guide rods 123 and 124 slidably supported by the forming wheel, the rod 123 being slidable in a bushing 125 which provides a guide for a spring 126. Spring 126 is operative to return the knock off plunger 120 and its supporting bar 122 from the positions shown at the right hand side of shaft 78 in Fig. 7, to the positions indicated by numerals 120$^a$ and 122$^a$ at the left of shaft 78. Whenever a bar 122 moves into a position which is on a center line joining the axes of shaft 77 and shaft 78, it is in position to be operated upon by a plunger 130 carried at the lower end of a link 131 having its intermediate portion bent around (as shown in Fig. 2) to clear certain parts of the mechanism, and having its upper end attached by pin 132 to a lever 133. Lever 133 is pivoted at 134 on pedestal 26 and attached by pin 135 (see Fig. 8) to the forked end 136 of a slide 137 which is provided with an oblong aperture 138 for receiving a bar 139 attached by screws 140 to pedestal 26. A slide-way 141 provided in pedestal 26 for receiving the slide 137 is covered by a plate 142 attached by screws 143. A cam roller or follower 144 is attached to slide 137 by screw 145 and cooperates with a cam disk 146 provided with teeth 147 spaced by notches 148 and attached to the gear 103 by bolts 149. A spring 150 is interposed between the block 137 and the bar 139 for the purpose of maintaining the roller 144 in contact with the cam 146. It is apparent that rotation of the cam 146 will produce vertical reciprocation of the slide 137, and, consequently, of the plunger 130. The gears 81 and 82 and the cam 146 are so timed relative to machine operation that, as one of the bars 122 moves under the plunger 130, there will be reciprocation of the plunger 130 to effect the downward movement of the knock off plunger 120.

Referring to Fig. 2 it will be noted that the lug 111 supports the cord 112 a short distance below the plane of the upper surface of the gears 81 and 82, and by referring to Fig. 7 it will be noted that the spring 126 is capable of returning the knock off plunger 120 into a position so that its lower end will extend slightly below the under surface of the loop forming gear. It is therefore necessary to provide means for lifting the knock off plunger 120 from a position such as indicated at 120$^a$ in Fig. 2 into a higher position, so that, by the time the knock off plunger 120 has arrived at a position adjacent the cord 112, the lower end of the plunger will be located above the cord. The mechanism for elevating the knock off plunger 120 includes spiral ledges or camming flanges 155 and 156 formed integrally with the hubs 75 and 76, respectively, of arms 73 and 74. The upper surfaces of these cams 155 and 156 are adapted to receive rollers 158, each attached to a block 122. In Figs. 5 and 6 the lower end of cam 155 is indicated at 155$^a$ and the end higher in elevation at 155$^b$; and the lower end of cam 156 as indicated at 156$^a$ and the higher end at 156$^b$. Fig. 2 shows the operation of cam 156 in causing the bars plungers 120 to be moved above the position in 120$^a$ into higher positions indicated at 120$^b$, 120$^c$, 120$^d$, etc., the highest position of a plunger 120 being such that its lower end is above the cord 112 when that plunger is brought over the cord. One of the more elevated positions of a plunger is indicated at 120$^e$ in Fig. 10.

*Mechanism for packing cord loops in plate slots.*

Adjacent each side of the clutch plate 30 there are located packing bars 160, each having a curved surface 161 adapted to bear against the portions of the cord loops which extend beyond the surfaces of the plates 30. The packing bars 160 are joined by a yoke portion 162 which is adapted to straddle the plate 30 and provide clearance for the rotation of the plate for all positions of operation of the packing bars 160. The inside bar 160 is mounted on a lever 163 attached by screw 164 to a stud 164$^a$ screwed into a hole 165 tapped into the base 61 of bracket 60.

The shelf 62 is provided with a slide way 166 for receiving a slide or plunger 167 which includes a yoke 168 and branches 169 and 170 and branches 171 and 172. Between branches 171 and 172 is located a spring 173 bearing at one end against the yoke 168 and at the other end against a stop 174 provided on the shelf 62 of bracket 60. The branches 169 and 170 each carry a roller 175 attached by a screw 176. The spring 173 causes each roller 175 to be pressed against a packing bar 160.

It will be noted that as a plate is filled with friction cord a packing bar 160 will move toward the center of rotation of the plate. It is also apparent that the loops which are formed in the friction cord should be relatively long as shown in Fig. 6 when the first turn of cord material is woven upon the plate, and that when the last turn of cord is woven in place the loops should be relatively short as shown in Fig. 5. In order to provide for gradually diminishing the length of these loops as the winding proceeds to completion, the shafts 77 and 78 are gradually moved from the positions indicated in Fig. 6 to positions which are further apart (as shown in Fig. 5). In order to accomplish this movement of shaft 77 and 78 the motion of the packing bars 160 toward the center of the plate 30 is utilized. In Figs. 5 and 6 for sake of clearness the slide 167 is shown in dot and dash lines. The branches 171 and 172 are provided with extensions 181 and 182 respectively which are provided with elongated holes 183 and 184 respectively which receive respectively the reduced upper ends 77$^b$ and 78$^b$ of shafts 77 and 78 respectively. These reduced ends are received by bushings 185 which slide within the holes 183 and 184 and rest upon the upper surfaces of the projections 181 and 182. Downward movement of the shafts 77 and 78 is prevented by means of collars 186 which are pinned to these shafts.

A rod 187 is pinned at 188 to the yoke 168 and passes through the spring 173 and through a hole 189 provided in a boss 190 located on shelf 62. This rod retains the spring 173 in position.

The lower surface 90$^a$ of the lug which provides the bearing 90 (see Fig. 4) serves to retain the slide 167 upon the shelf 62.

*Mechanism for indicating when clutch plate is full.*

Figure 12:
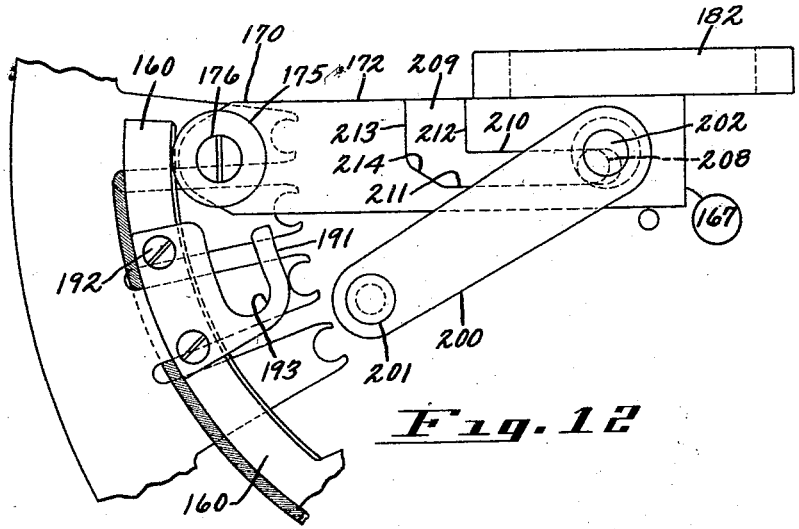
Figs. 12 and 13 are fragmentary views on an enlarged scale showing in two positions of operation a locking mechanism for retaining certain parts of the machine while a filled clutch plate is removed and an empty one replaced for weaving in the clutch material.
Figure 13:
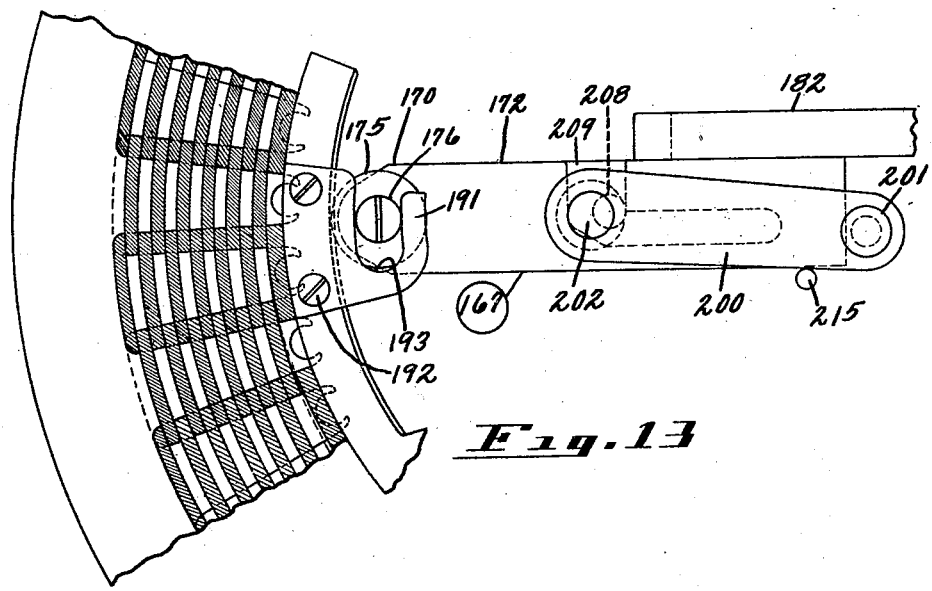

Each presser bar 160 carries a clip 191 by screws 192 and provided with a notch 193 for receiving the head of a screw 176. As the weaving continues (as indicated by Figs. 12 and 13), the screws 176 and the clips 191 will move toward the center and the screws 176 will be received by the notches 193 as shown in Fig. 13. The inward movement of the slide 167 is utilized also to operate an indicator which is visible from the exterior which will show when the weaving operation has been completed. This member can also be used to retain the parts 160 and 167 in position shown in Fig. 13 while a clutch plate is being replaced.

This indicating mechanism includes a lever 200 provided with a handle 201, and attached to a shaft 202 which is journalled in a bearing provided by hole 203 formed in a boss 204 carried by shelf 62. A screw 205 received by a hole 206 tapped in boss 204 and projecting into a groove 207 in shaft 202 limits endwise motion of said shaft. Shaft 202 is provided with a projection or stud 208 eccentric to the axis of shaft 202. Stud 208 projects into a groove 209 provided in the branch 172 of slide 167. This groove 209 is included between substantially horizontal surfaces 210 and 211, substantially vertical surfaces 212 and 213 and an inclined surface 214 joining the surfaces 211 and 213.

During the major part of the weaving operation the handle 200 will occupy the position shown in Fig. 12. Just before completing the weaving the stud 208 will be engaged by the inclined surface 214 with the result that the lever 200 will start to move clockwise into a horizontal position. When lever 200 is substantially horizontal the weaving operation will be substantially completed.

In order to lock the slide 167 in innermost position the handle 200 is rotated into the position shown in Fig. 13 until it engages a stop 215. Then the spring 173 is locked in position and prevented from extending and forcing the members 167 and 160 from the positions shown in Fig. 13.

*Mode of operation.*

A clutch plate 30 is mounted upon the clutch plate support 29 by means of nuts 42 and bolts 43 in the manner described, the plate being inserted between the presser bars 160 and between the branches 169 and 170 of the slide 167. The friction cord, which is carried on a supply reel near the machine, is attached to the plate 30 by knotting the free end of the cord and slipping it into one of the radial notches 32 which are located below the loop forming wheels 81 and 82. Before turning the lever 200 from the position shown in Fig. 13 to the position shown in Fig. 12 the cord 112 is positioned between the forming wheels 81 and 82 as shown in Fig. 5, and is located in the groove provided in the lug 111. Then the lever 200 is rotated counterclockwise to the position shown in Fig. 12 in order to release the spring 173 and permit the packing bars 160 to move into operating position. The handle 53 is moved to cause the clutch 51 to engage the pulley 50 thereby effecting rotation of the shaft 24 and the driving of the plate 30 in clockwise direction, the forming gear 81 clockwise, and the forming gear 82 counterclockwise. As the plate 30 rotates, the forming gears 81 and 82 will also rotate so as to form loops having a spacing corresponding to that spacing of the slots 32. Each loop of the cord 112 which is formed around a forming wheel tooth which is in alignment with the line joining the centers of shafts 77 and 28, as shown in Fig. 6, will be located vertically over the lowest plate tooth 31 as shown in Fig. 2.

As this loop of the cord is formed, the plunger 130 will descend and cause the knock off plunger 120 to introduce the loop referred to into the slot 32 indicated in Fig. 2. During the rotation of the plate 30, the loops will be introduced in the plate slot in the manner described causing consecutive loops to pass successively around one side of a clutch plate tooth and then around the opposite side of an adjacent tooth. As the cord 112 comes into contact with the packing bars 160 it will be cammed as far as it will go toward the bottom of the slots 32, so that the successive turns or windings of the friction cord will be packed closely together.

Completion of the weaving operation is indicated by the movement of the handle 200 from the position shown in Fig. 2 or 12 to a horizontal position as already explained. The operator will then stop the machine by disengaging the clutch, will sever the supply reel of cord from that which is woven on the clutch plate 30.

The weaving operation is complete and the clutch plate is now ready to be operated upon in order to retain friction material permanently in place.

*Apparatus for permanently securing friction material in position.*

Referring to Figs. 1, 2 and 11 the boss 190 on shelf 62 is provided with a hole 220 (see Fig. 15) which provides a bearing for a shaft 221 attached adjacent one end to a collar 222, and adjacent the other end, to an arm 223 on which are pivotally mounted by means of a screw 224 a forming wheel 225 and two disks 226 between which the wheel 225 is located. The forming wheel 225 is notched at 227 to provide spaced teeth 228 which are adapted to enter between the prongs 34 of a plate tooth 31 and bend these prongs into the positions indicated at 34ª in Fig. 11. The result is that each notch 32 is substantially closed so that the friction material will be retained on the teeth 31 of the plate 30. The shaft 221 is provided with a squared end 230 provided for the attachment of a lever 231 having a squared opening adapted to fit over the end 230.

After the cord 112 has been severed from the supply wheel the lever 231 is attached to the shaft end 230 and the machine again set in operation. By moving the lever 231 clockwise the forming wheel 225 can be forced away from the center of the clutch plate 30 in order to bend the prongs 34 into position 34ᵃ as already explained.

Before removing the completed plate the lever 200 is moved into the position shown in Fig. 13 to retain the packing bars 160 and the slide 167 in innermost position to prevent interference with plate removal. The handle 231 is removed and the nuts 42 are loosened, and the bolts 43 moved back toward the side of the clutch plate cord 29. Then the completed plate can be removed from the machine.

In order to inclose the gear 103 and the cam 146, there is provided a gear guard 240 provided with a lug 241 attached by screws 242 to the pedestal 26 and also by means of the cover plate 142 which provides a mounting lug for said guard. The gear 46 is enclosed by a guard 245 which is attached by lugs 246 and screws 247.

While the forms of embodiment of the present invention as herein disclosed, constitute preferred forms, it is to be understood that other forms might be adopted, all coming within the scope of the claims which follow.

What I claim is as follows:

1. Apparatus for attaching cord to a toothed plate comprising, in combination, means for progressively forming loops in the cord; and means for moving the cord with the loops therein progressively from said loop forming means to and about the teeth of the plate.

2. Apparatus for attaching cord to a toothed plate comprising, in combination, means for forming loops in the cord; means for moving the loops progressively about the teeth of the plate; and means for pressing the looped cord into the notches between the teeth.

3. Apparatus for applying cord to a plate having teeth spaced from one another by notches comprising means for supporting and for rotating the plate; means operating in unison with said plate rotating means for shaping the cord in substantial conformity with the teeth and notches of the plate; and means operating in unison with said plate rotating and said cord shaping means for placing the shaped cord upon the teeth and within the notches of the plate.

4. Apparatus for applying cord to a plate having teeth spaced from one another by notches comprising means for supporting and for rotating the plate; means operating in unison with said plate rotating means for shaping the cord in substantial conformity with the teeth and notches of the plate; means operating in unison with said plate rotating and said cord shaping means for placing the shaped cord upon the teeth and within the notches of the plate; and means for continuously pressing the shaped cord in place upon the plate.

5. Apparatus for attaching cord to a circular plate having teeth spaced by notches comprising, in combination, means for rotating the plate; means for forming loops in the cord; and means for pushing the loops progressively around the teeth of the plate.

6. Apparatus for attaching cord to a circular plate having teeth spaced by notches comprising, in combination, means for rotating the plate; means for forming loops in the cord; means for pushing the loops progressively around the teeth of the plate; and means for pressing the looped cord into the notches.

7. Apparatus for attaching cord to a circular centrally apertured plate having inwardly extending teeth spaced by notches comprising, in combination, means for weaving the cord progressively about the teeth; and means for pressing the woven cord within the notches.

8. Apparatus for attaching cord to a circular centrally apertured plate having inwardly extending teeth spaced by notches comprising, in combination, means for rotating the plate; and means for causing the turns of cord to be attached to the plate by looping the cord about the teeth of the plate.

9. Apparatus for attaching cord to a circular centrally apertured plate having inwardly extending teeth spaced by notches comprising, in combination, means for forming loops in the cord; and means for pushing the loops progressively around the teeth of the plate.

10. Apparatus for attaching cord to a circular centrally apertured plate having inwardly extending teeth spaced by notches comprising, in combination, means for forming loops in the cord; means for pushing the loops progressively around the teeth of the plate; and means for the looped cord toward the outer edge of the plate.

11. Apparatus for attaching cord to a circular plate provided with radially extending notches to form spaced teeth comprising, in combination, means for forming loops in the cord; means for pushing the loops around the teeth and into the notches; and means for varying the length of loop formed in the cord depending on the amount of cord material inserted into the notches.

12. Apparatus for attaching cord to a circular plate provided with radially extending notches to form spaced teeth comprising, in combination, means for rotating the plate; means for causing the turns of cord to be attached to the plate by looping the cord about the teeth of the plate; and means for varying the length of loop formed in the cord depending on the amount of cord material inserted into the notches.

13. Apparatus for attaching cord to a circular centrally apertured plate having inwardly extending teeth spaced by radially extending notches comprising, in combination, means for rotating the plate; means for causing the turns of cord to be attached to the plate by looping the cord about the teeth of the plate; and means for causing the loops to become shorter in length as the notches are filled with material.

14. Apparatus for attaching cord to a circular centrally apertured plate having inwardly extending teeth spaced by radially extending notches comprising, in combination, means for rotating the plate; means for forming the loops in the cord; means for pushing the loops around the teeth; and means for pressing the looped cord into the notches.

15. Apparatus for attaching cord to a circular centrally apertured plate having inwardly extending teeth spaced by radially extending notches comprising, in combination, means for rotating the plate; means for forming loops in the cord; means for pushing the loops around the teeth; means for pressing the looped cord into the notches; and means actuated by the pressing means for controlling the looping means in order to provide shorter loops as the notches are filled with material.

16. Apparatus for attaching cord to a toothed plate comprising, in combination, means for forming loops in the cord extending alternately beyond opposite sides of the plate; and means for moving the cord away from said loop forming means and into notches between the teeth of the plate.

17. Apparatus for attaching cord to a toothed plate comprising, in combination, means for moving the plate; two cooperating rotatable toothed wheels for engaging the cord to form progressively loops in the cord adjacent the ends of the teeth of the plate; and means for pushing the loops successively from the forming wheels to a position about the teeth of the plate.

18. Apparatus for attaching cord to a toothed plate comprising, in combination, means including cooperating toothed wheels meshing adjacent the end of a plate tooth for engaging the cord to form progressively loops in the cord extending alternately beyond opposite sides of the plate; means for rotating the wheels in opposite directions, and for moving the plate whereby to bring the teeth thereof successively into alignment with the meshed teeth of the forming wheels; and means for progressively moving the cord loops from the wheels and locating them around the plate teeth.

19. Apparatus for attaching cord to a toothed circular plate comprising, in combination, means including cooperating toothed wheels meshing adjacent the end of a plate tooth for engaging the cord to form progressively loops in the cord extending alternately beyond opposite sides of the plate; means for rotating the wheels in opposite directions, and for rotating the plate whereby to bring the teeth thereof successively into alignment with a meshed tooth of the forming wheels; and means for progressively moving the cord loops from the wheels and locating them around the plate teeth.

20. Apparatus for attaching cord to a toothed plate comprising, in combination, means including cooperating toothed wheels meshing adjacent the end of a plate tooth for engaging the cord to form progressively loops in the cord extending alternately beyond opposite sides of the plate; cord removing means located adjacent the end of each forming wheel tooth; means for rotating the wheels in opposite directions, and for moving the plate whereby to bring the teeth thereof successively into alignment with the meshed tooth of the forming wheels; and means for actuating the cord removing means of the wheel tooth which is aligned with a plate tooth.

21. Apparatus for attaching cord to a toothed plate comprising, in combination, means including cooperating toothed wheels meshing adjacent the end of a plate tooth for engaging the cord to form progressively loops in the cord extending alternately beyond opposite sides of the plate; a cord removing plunger mounted on each tooth for movement across the end face thereof; means for rotating the wheels in opposite directions, and for moving the plate whereby to bring the teeth thereof successively into alignment with the meshed tooth of the forming wheels; and means for actuating the cord removing plunger of the wheel tooth which is aligned with a plate tooth.

22. Apparatus for attaching cord to a centrally apertured circular plate having radially extending notches providing inwardly extending teeth comprising, in combination, a rotatable support to which a plate can be detachably secured; a pair of meshing toothed wheels mounted to rotate in a plane perpendicular to the plate, the meshed tooth of the wheels being in alignment with a tooth of the plate, said toothed wheels engaging the cord to form progressively loops in the cord extending alternately beyond opposite sides of the plate; a cord removing plunger mounted on each tooth for movement across the end face thereof; means for rotating the forming wheels in opposite directions, and for rotating the plate support whereby to bring the plate teeth successively into alignment with the meshed tooth of the forming wheels; and means for actuating the cord removing plunger of the wheel tooth which is aligned with a plate tooth.

23. Apparatus for attaching cord to a toothed plate comprising, in combination, a movable plate support; a pair of meshing toothed wheels mounted to rotate in a plane perpendicular to the plate, the meshed tooth of the wheels being in alignment with a tooth of the plate, said toothed wheels engaging a cord to form progressively loops in the cord extending alternately beyond opposite sides of the plate; means for rotating the forming wheels in opposite directions and for moving the plate support whereby to bring the plate teeth successively into alignment with the meshed tooth of the forming wheels; means for causing the cord loops to be removed from the forming wheels and be placed around the plate teeth; means for pressing the cord into the slots; and means actuated by the pressing means for varying the distance between the forming wheels as the plate is filled with material.

24. Apparatus for attaching cord to a toothed plate comprising, in combination, means for weaving the cord progressively about the teeth; means travelling across the face of the plate for pressing the woven cord within the notches spacing the teeth of the plate; and means for locking the pressing means in one of its positions of travel to facilitate removal of the plate from the apparatus.

25. Apparatus for attaching cord to a plate provided with spaced teeth, each tooth having two prongs comprising, in combination, means for interweaving the cord and teeth of the plate; and means for bending the prongs of the teeth in order substantially to close the notches in the plate between the teeth.

26. Apparatus for attaching cord to a toothed plate comprising, in combination, means for interweaving the cord and the teeth of the plate; and means for deforming the teeth in order substantially to close the notches in the plate between the teeth.

In testimony whereof I hereto affix my signature.

WILLIAM L. O BRIEN.

Witnesses:
GEO. E. PASCO,
ELMER E. FREED.